United States Patent [19]
Anderson

[11] Patent Number: 4,586,186
[45] Date of Patent: Apr. 29, 1986

[54] MAINTENANCE RESPONSE SIGNALLING ARRANGEMENT FOR A DIGITAL TRANSMISSION SYSTEM

[75] Inventor: Cleo D. Anderson, Colts Neck, N.J.

[73] Assignee: AT&T Bell Laboratories, Murray Hill, N.J.

[21] Appl. No.: 521,411

[22] Filed: Aug. 8, 1983

[51] Int. Cl.⁴ .......................... H04B 3/36; H04B 9/00
[52] U.S. Cl. ............................................ 375/3; 370/8; 370/11; 370/110.4; 375/120; 455/601
[58] Field of Search ................... 455/45, 61, 102, 226, 455/601; 370/8, 11, 110.4; 375/3, 120

[56] References Cited

U.S. PATENT DOCUMENTS

| | | | |
|---|---|---|---|
| 3,718,766 | 2/1973 | Stover | 370/8 |
| 4,015,083 | 3/1977 | Bellisio | 375/120 |
| 4,079,203 | 3/1978 | Dragoo | 370/11 |
| 4,121,195 | 10/1978 | Jessop | 375/3 |
| 4,300,239 | 11/1981 | Wakabayashi et al. | 455/601 |
| 4,313,224 | 1/1982 | Wakabayashi et al. | 455/601 |
| 4,369,523 | 1/1983 | Seki et al. | 455/601 |
| 4,499,600 | 2/1985 | Powell et al. | 455/601 |

OTHER PUBLICATIONS

Bell System Technical Journal, Nov. 1963, "Systematic Jitter in a Chain of Digital Regenerators" by C. J. Byrne et al., pp. 2679-2714.
Ultrasonics Symposium Proceedings, Sep. 1979, "Crossed-Resonator SAW Filter: A Temperature-Stable Wider-Band, Filter on Quartz" by R. L. Rosenberg et al., pp. 836-840.
Transmission Systems for Communications, 5th Ed., Bell Telephone Laboratories, 1982, pp. 686-688.
AT&T Tender for TAT8 Lightwave Submarine Cable System, May 16, 1983, Technical vol. Section 7.1.2, pp. 7.1.2-50 to 7.1.2-58.

Primary Examiner—Joseph A. Orsino, Jr.
Attorney, Agent, or Firm—Richard B. Havill

[57] ABSTRACT

A maintenance response signalling arrangement for a digital transmission system transmits response signals from a repeater to an end terminal. From the repeater, response information is modulated onto a subcarrier which is superimposed as a jitter signal on the main data stream. At the end terminal, the response information is recovered from the jitter signal on the main data stream.

3 Claims, 16 Drawing Figures

TABLE A

| FRAME | BLOCK | BIT POSITIONS | | | | | | | | | | | | | | | | | | | | | | | | PARITY |
|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
| 1 | 1 | | | | | | | | | | | | | | | | | | | | | | | | | | P |
| | 2 | | | | | | | | | | | | | | | | | | | | | | | | | | P |
| | 55 | | | | | | | | | | | | | | | | | | | | | | | | | | P |
| | 56 | | | | | | | | | | | | | | | | | | | | | | | | | | P |
| 2 | 1 | | | | | | | | | | | | | | | | | | | | | | | | | | P |
| | 2 | | | | | | | | | | | | | | | | | | | | | | | | | | P |
| 3 | 55 | | | | | | | | | | | | | | | | | | | | | | | | | | P |
| | 56 | | | | | | | | | | | | | | | | | | | | | | | | | | P |
| 4 | 1 | | | | | | | | | | | | | | | | | | | | | | | | | | P |
| | 2 | | | | | | | | | | | | | | | | | | | | | | | | | | P |
| | 55 | | | | | | | | | | | | | | | | | | | | | | | | | | P |
| | 56 | | | | | | | | | | | | | | | | | | | | | | | | | | S |
| 1 | 1 | | | | | | | | | | | | | | | | | | | | | | | | | | P |

TABLE B

| BITS | COMMAND CODE WORD FORMAT |
|---|---|
| 1 | EVEN PARITY FOR SIGNAL BITS |
| 2–10 | REPEATER ADDRESS |
| 11–12 | RELAY CONTROL |
| 13–16 | OPERATION TO BE PERFORMED |
| 17–19 | REGENERATOR IDENTIFICATION |
| 20 | END BIT – ALWAYS A "1" |

FIG. 15

TABLE C

| BITS | RESPONSE CODE WORD FORMAT |
|---|---|
| 1-20 | DUPLICATE OF RECEIVED COMMAND CODE WORD |
| 21-29 | BINARY CODED BIT ERROR COUNT |
| 30-31 | LASER POWER STATE |
| 32-39 | ERROR MONITOR STATE/SIGNAL PATH STATE |
| 40 | END BIT - ALWAYS A "1" |

MAINTENANCE RESPONSE SIGNALLING ARRANGEMENT FOR A DIGITAL TRANSMISSION SYSTEM

BACKGROUND OF THE INVENTION

This invention relates to a maintenance response signalling arrangement for a digital transmission system and more particularly to a maintenance response signalling arrangement that transmits by way of a jitter channel superimposed on the main data stream.

Line monitoring and fault locating functions are used in the prior art to maintain a digital transmission system. One method used for line monitoring is to determine a bit error rate by inserting at the transmitting terminal a parity bit in a predetermined position in the data stream after each block of data. Each block of data and its parity bit are analyzed for parity violations at the receiving terminal or at an intermediate point along the line. Any parity violations are counted over a period of time and are computed into a bit error rate. One arrangement for line monitoring in accordance with the foregoing description has been disclosed in U.S. Pat. No. 4,121,195.

Fault locating is a procedure used for determining which repeater section of the line is the source of a trouble condition when the line monitoring arrangement indicates there is an inordinately high bit error rate.

A problem with the prior art line monitoring and fault locating systems is that they are separate from the main transmission system and add significant expense to the construction and operation of the system. They are separate partly because of difficulty in applying a return signal from a repeater onto the bit stream.

SUMMARY OF THE INVENTION

This problem is solved by a maintenance response signalling arrangement for a digital transmission system using a main data stream between a repeater and an end terminal. From the repeater, response information is modulated onto a subcarrier which is superimposed as a jitter signal onto the main data stream. At the end terminal the response information is recovered from the jitter signal on the main data stream.

BRIEF DESCRIPTION OF THE DRAWING

The invention may be better understood by reading the subsequent detailed description with reference to the appended drawing wherein

FIG. 15 is a table showing the format of response code words used for transmitting response information from a repeater to an end terminal.

DETAILED DESCRIPTION

Figures 1, 2, 3:
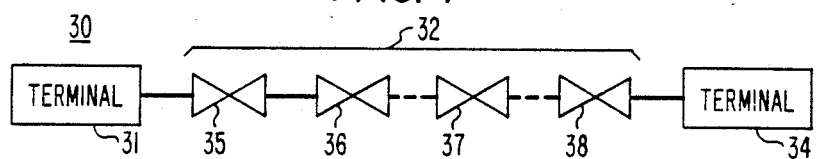
FIG. 1 is a block diagram of a digital transmission system including a repeatered line.
FIG. 2 is a table showing the framing format of a pulse stream for the transmission system of FIG. 1.
FIG. 3 is a table showing the format of command code words used for control signalling in the system of FIG. 1.

FIG. 1 shows an optical fiber transmission system 30 arranged for deployment under an ocean. It is designed to transmit pulse code modulation signals from a west end terminal 31 through a repeatered line 32, which may be as long as several thousand kilometers, to an east end terminal 34. Simultaneously another pulse stream is transmitted from the east end terminal 34 to the west end terminal 31. The optical pulse streams are attenuated in fibers along the line. At repeaters 35, 36, 37 and 38 located regularly along the line, the pulse streams are regenerated to insure good quality transmission. Although only four repeaters are shown in FIG. 1, as many as a hundred or more repeaters may be used in the line. Thus the line is shown broken between repeaters 36, 37 and 38 to indicate that additional repeater sections may be inserted.

A parity error detecting scheme is used in the system for monitoring continuously the quality of signal transmission in both directions along the line.

As shown in TABLE A in FIG. 2, the pulse code modulation line signals are formatted in repetitive groups of four frames, each frame including fifty-six blocks of encoded data. Each block includes twenty-five bits. There are twenty-four data bits plus an even parity bit P in each block except the last block 56 of frame 4 which may include a signalling bit S in place of the parity bit. The parity bits are located in the last bit position of the blocks. The blocks of data are transmitted from terminal to terminal in both directions simultaneously. Thus the parity bits in the frames provide a parity channel in both directions of transmission from terminal to terminal through the entire length of the system.

In addition to its use for measuring end-to-end bit error rate, a maintenance signalling system is superimposed on this parity channel for controlling the monitoring of in-service performance of the repeater sections, for controlling the substitution of spare devices or equipments in repeaters located on the ocean floor, and for controlling other functions such as substituting one fiber for another fiber.

In the parity channel, one parity bit position of every fourth frame is assigned to maintenance signalling. This repetitive bit position S, located in the last bit position of the block 56 in frame 4 of FIG. 2, is used for transmitting commands from either one of the terminals out along the repeatered line toward the other end terminal. A resulting stream of signalling bits S, including one-out-of-224 bits in the parity bit channel, is ignored at the far end for determining the bit error rate of the system. Hereinafter this stream of signalling bits is referred to as a command channel for maintenance signalling. Such command channel is available in both directions in the system so that maintenance command signalling can be initiated from either end terminal.

The maintenance command signalling is used in the transmission system for performing a variety of functions. A bit error rate can be determined selectively at every line section in the system on an in-service basis. The automatic gain control voltage and the laser bias current associated with every regenerator can be monitored selectively. By remote control, spare equipments, such as laser transmitters, regenerators and fibers, can be switched to replace other similar failing or failed equipments in the system.

Such maintenance command signalling is accomplished by encoded commands sent out along the repeatered line in either command channel. For reasons of clarity, only one channel is to be described hereinafter, however, it is to be understood that the description is applicable to the maintenance command channels for both directions of transmission.

TABLE B of FIG. 3 shows a command code word format which is used for maintenance command signalling in the transmission system. There are twenty bits per command code word. The first bit is an error detecting parity bit for the word. It is selected to provide even parity for the bits of the word. Bits 2-10 are address bits for addressing individually the repeaters along the line. Nine bits are used for addresses to enable the addressing of as many as 512 line repeaters in a very long transmission line. Two bits 11 and 12 are used for controlling relays to switch spare equipment in place of failing equipment. Four bits 13-16 are encoded with information for directing which one of sixteen possible operations is to be performed at the addressed repeater. Another three bits, 17-19, identify which of up to eight regenerator circuits at the addressed repeater is the subject of the command. Lastly an end bit 20 is inserted. In the command code words, the end bit is always a "1".

Figure 4:
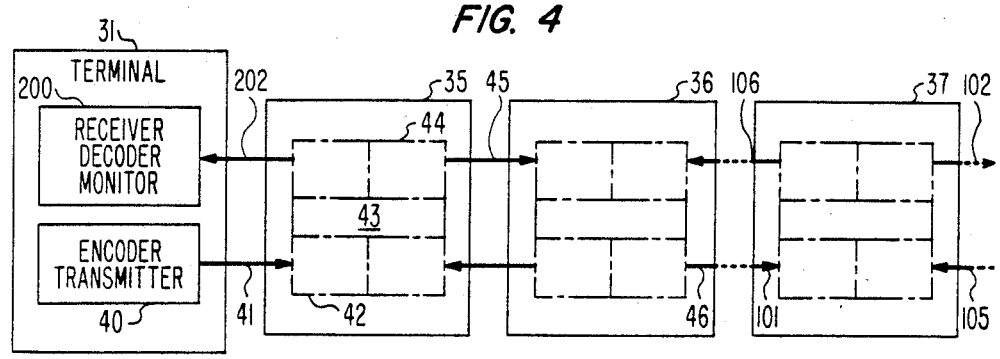
FIG. 4 is a block diagram of a portion of the repeatered transmission line of FIG. 1.

Referring now to FIG. 4, there is shown a block diagram of a portion of the transmission system of FIG. 1. The same designators, used in FIG. 1, are used in FIG. 4 to identify elements which are common to both FIGS. 1 and 4.

In the west terminal 31, an encoder and transmitter circuit 40 encodes command code words which are to be transmitted along the line of repeaters 35, 36 and 37 to a selected one of the repeaters or to all of the repeaters. The coded command words are transmitted along an optical fiber 41 to an eastbound receiver-regenerator circuit 42 located at the repeater 35. Upon detection in the circuit 42, the command code word is applied to, stored in, and decoded by common supervisory logic circuitry 43. This common supervisory circuitry is time shared by the eastbound and westbound command channels at the repeater 35. Other similar channels, not shown in FIG. 4, also can share the common supervisory circuitry 43 at the repeater 35. Once decoded, the command code word controls performance of some function within the repeater 35 if that repeater is addressed by that code word.

Whether or not the repeater 35 is addressed, the command code word is applied from the receiver-regenerator circuit 42 to an eastbound transmitter circuit 44 as a part of the data stream for continuing transmission over an optical fiber 45 to the next line repeater 36. Except for being inverted from top to bottom in FIG. 4 and except for individualized address decoding within the common supervisory circuitry, the repeater 36 is similar to the repeater 35. The command code word is detected, stored, and decoded in the repeater 36. Again the command code word is transmitted as a part of the data stream further along the repeatered line by way of an optical fiber 46.

Eventually the command code word is received at the repeater 37 which we assume is being addressed. The eastbound data stream is received on an optical fiber 101 and is transmitted on a fiber 102. Likewise the westbound data stream is received and transmitted, respectively, on fibers 105 and 106.

Figure 5:
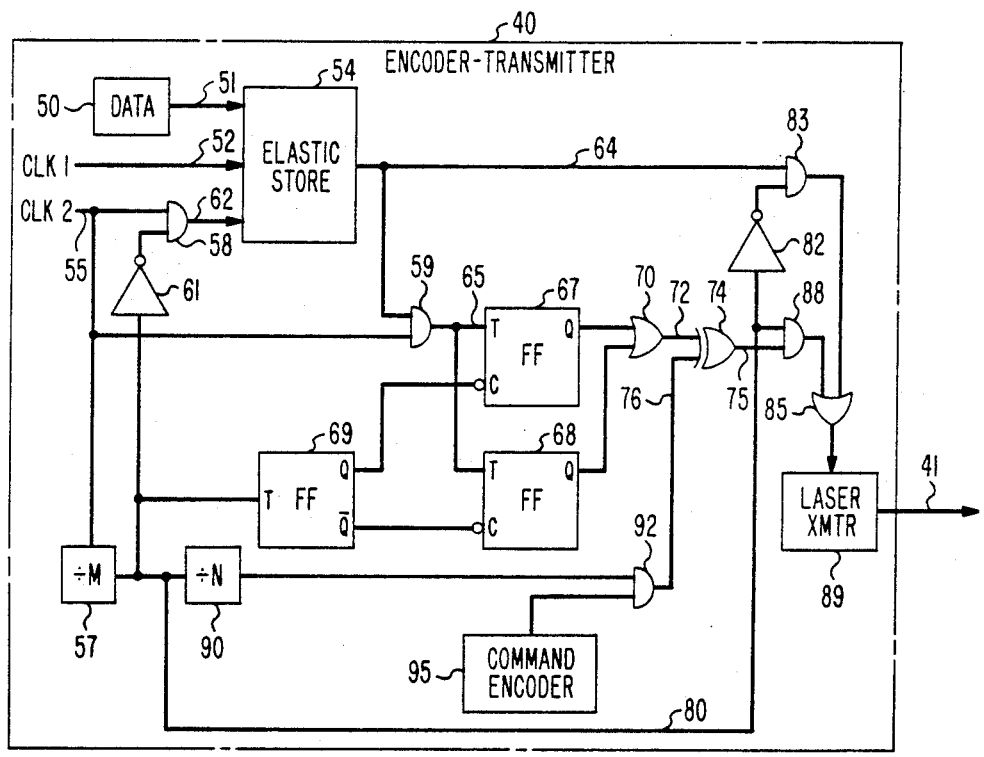
FIG. 5 is a logic diagram for an encoder transmitter circuit used in a terminal of the transmission line of FIG. 4.

Referring now to FIG. 5, there is shown in detail the terminal encoder-transmitter circuit 40 of FIG. 4. In FIG. 5, the circuit 40 is arranged for inserting even parity bits into the eastbound main data bit stream. The data stream is generated electronically by a data source 50 and is applied to a lead 51 at a rate of $[(M-1)/M]f_b$. Factor M is the number of bit positions in a block and therefore equals 25 in this example. Parameter $f_b$ is the bit rate of the system which may be, for example, $296 \times 10^6$ bits/sec. In parallel with the data stream, there is applied by way of a lead 52 an input clock signal CLK 1 for writing the input data into an elastic store 54. Clock signal CLK 1 operates at the rate $[(M-1)/M]f_b$ of the input data stream.

The elastic store 54 is a known arrangement for receiving a data stream at one constant clock rate and transmitting that data stream at a slightly different clock rate. Average rates of input and output data flow are the same. An example of such an elastic store is described on pages 686-688 of "Transmission Systems for Communications", 5th Edition, Bell Telephone Laboratories, Inc., 1982.

A transmitter clock signal CLK 2 at the bit rate $f_b$ is applied by way of a lead 55 for timing the output data stream to be transmitted along the repeatered line. In the encoder-transmitter circuit 40, the transmitter clock signal CLK 2 is applied to the input of a digital divider circuit 57 and to a pair of AND gates 58 and 59. The divider circuit 57 divides the rate of the transmitter clock signal CLK 2 by the factor M to produce a modified clock signal at a rate of $(1/M)f_b$. This modified clock signal is complemented by an inverter 61 and is applied as a gating input to the AND gate 58.

AND gate 58, being responsive to the transmitter clock signal CLK 2 and to the inverted modified clock signal, applies a read clock signal by way of a lead 62 to the elastic store 54. That read clock signal on the lead 62 includes M−1 pulses at the bit rate $f_b$ followed by a gap of one pulse duration.

Since the data stream stored in the elastic store 54 is read out in response to the clock signal on the lead 62, the output on a lead 64 is a repetitive stream of M−1 data bits followed by a vacant pulse time slot. The clock rate for reading out is the bit rate $f_b$ of the transmitter clock signal CLK 2.

The bit stream on the lead 64 is applied to the AND gate 59 together with the transmitter clock signal CLK 2. In response to those inputs, the AND gate 59 reproduces the output data stream of lead 64 on a lead 65 for driving the inputs of a pair of toggle flip-flops 67 and 68. The flip-flops 67 and 68 are both triggered by each "one" pulse of the data bit stream to count modulo-2 for the purpose of determining an even parity bit to be inserted in the output bit stream.

Although both of the flip-flops 67 and 68 are arranged to count the ones in the data bit stream, they count modulo-2 alternatively. They are enabled for alternate counting by the complementary outputs Q and $\overline{Q}$ of a toggle flip-flop 69, which are applied to the respective clear inputs of the flip-flops 67 and 68. Outputs of the flip-flops 67 and 68 are ORed through a gate 70 to produce on a lead 72 a bit stream from which parity bits are to be selected.

The bit stream on the lead 72 is applied to an EXCL OR gate 74 which transmits that same bit stream onto a lead 75 while a low level input signal is applied to the EXCL OR gate over another input lead 76. This mode of transmission occurs most of the time.

A transmitter output gating arrangement combines the output data stream on the lead 64 with parity bits which are selected from the bit stream on the lead 75. While the divider circuit 57 is counting M−1 pulses, its output on a lead 80 is low. This low signal on the lead 80 enables alternatively one of a pair of AND gates. The low signal on the lead 80 is inverted by an inverter 82 and enables an AND gate 83 to transmit M−1 bits of the data stream from the lead 64 to an OR gate 85. Simultaneously the other AND gate 88 is disabled for blocking transmission of the stream of bits from which the parity bit is to be selected. When the gap in the data stream arrives in the $M^{th}$ time slot of the data block, the divider circuit 57 applies a high signal to the lead 80. The AND gate 83 is disabled, and the AND gate 88 is enabled by the high signal on the lead 80. As a result the data stream, which is static on the lead 64 during this gap interval, is blocked from the OR gate 85 while an even parity bit is selected from the lead 75 and is applied to the input of the OR gate 85. Thus the even parity bit is inserted into the output data bit stream in the gap, or $M^{th}$ time slot, of the data block.

This process repeats to produce a continuous electronic data bit stream which is converted by a laser transmitter 89 into an optical pulse stream which is transmitted out on the optical fiber 41. The data bit stream includes M−1 data bits followed by the even parity bit. All of the even parity bits P are located in repetitive positions, i.e. a parity channel, in the transmitted optical stream, as shown in FIG. 2.

As just described, the encoder-transmitter circuit 40 transmits a data stream with even parity bits inserted in a parity channel. The parity bits are used for determining a bit error rate either along the line of repeaters shown in FIG. 1 or at the east terminal.

An advantageous system command signalling channel is superimposed on the parity channel by some additional logic circuitry that is included in the encoder-transmitter circuit 40. In this regard a divider circuit 90 is interposed to respond to the divided clock signal on the lead 80 producing a further reduced control clock signal pulse rate. The divider circuit 90 divides by a factor N which equals the number of blocks times the number of frames between signalling bits S, as shown in FIG. 2. The factor N is determined by system parameters to be discussed with respect to FIG. 13.

The control clock signal from the divider circuit 90 is applied to an AND gate 92 which is gated by pulses of the command code words. Normally the control clock signal from the divider circuit 90 is at a low or ground level which disables the AND gate 92. The resulting low level output signal from AND gate 92 on lead 76 allows the stream of parity bits to be transmitted through the EXCL OR gate 74 and over the lead 75 to the output AND gate 88. When the control clock signal from the divider circuit 90 occasionally rises to its high level, the AND gate 92 may produce a high level signal on the lead 76. The high level signal is produced on the lead 76 only when the output of a command encoder 95 and the control clock signal both are high concurrently. This high level signal on the lead 76 causes the parity bit on the lead 72 to be complemented by the EXCL OR gate 74 and put out on the lead 75.

The complemented parity bit is transmitted through the AND gate 88 and the output OR gate 85 in the parity channel the same as other parity bits. Significantly this complemented parity bit, or signalling bit S, is inserted into the parity channel in the last block of every fourth frame, whenever the output of the command encoder 95 is high. Because the signalling bits S are positioned cyclically, a command signalling channel is superimposed on the parity channel. From this command channel, the signalling bits S can be recovered readily along the repeatered line or at the east terminal. The recovered complemented parity bits, or signalling bits S, are detected and decoded into signals for controlling equipment or circuits, in accordance with the command code word format described previously with respect to FIG. 3.

Figure 6:
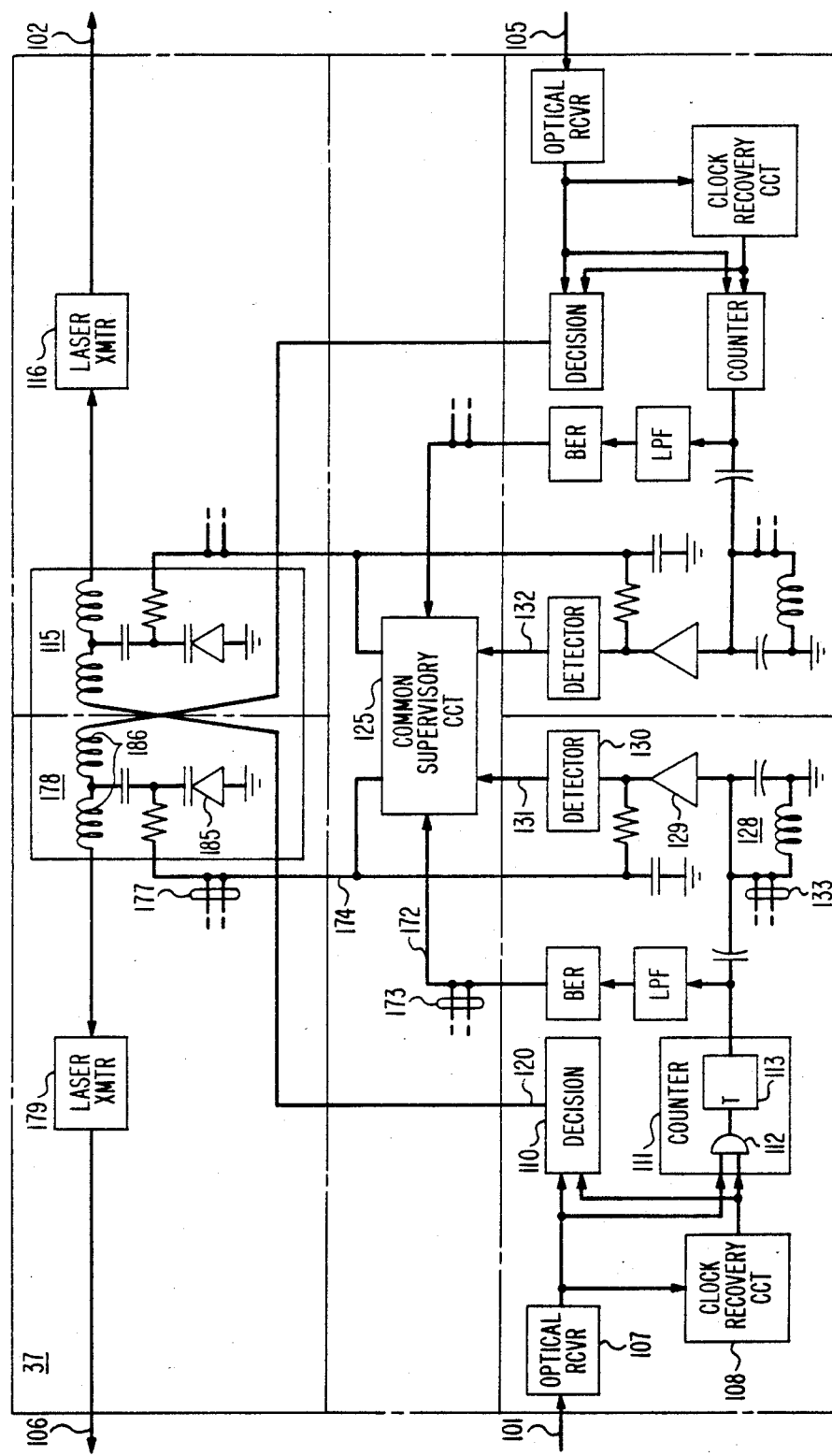
FIG. 6 is a partial block diagram of a repeater for the transmission line of FIG. 4.

Referring now to FIG. 6, there is shown a diagram of the line repeater circuit 37 which is arranged for both eastbound and westbound transmission. Therefore duplicate symmetrically designed circuits are included for the two way transmission. The optical data stream being transmitted eastbound is received on an optical fiber 101, is regenerated within the circuit 37, and is transmitted further eastward along the repeater line on another optical fiber 102. Optical fibers 105 and 106, respectively, receive and transmit an optical pulse stream for westbound transmission. Since there is symmetrical duplication within the circuit 37, operation of the circuit 37 is to be described primarily for one direction of transmission.

Considering eastbound transmission, the optical line signals received on the fiber 101 are converted to electronic signals by an optical receiver 107. The resulting electronic signals are applied to a clock recovery circuit 108 and a decision circuit 110. The clock recovery circuit 108 is a known arrangement such as a surface acoustic wave (SAW) filter, which is described by R. L. Rosenberg and L. A. Coldren in the *Ultrasonics Symposium Proceedings*, September 1979, pp. 836–840, or a phase-locked, frequency-locked loop, which is described in U.S. Pat. No. 4,015,083, issued to J. A. Bellisio. The output of the clock recovery circuit 108 is applied to the decision circuit 110 and to a modulo-2 counter 111. The decision circuit 110 is arranged in accordance with a circuit described in U.S. patent application, Ser. No. 495,067, which was filed May 13, 1983 in the name of R. M. Paski.

In response to the received data stream and the recovered clock pulses, the decision circuit 110 determines whether received pulses are zeros or ones at the times that the recovered clock pulses occur. Output signals from the decision circuit 110 are a regenerated version of the received bit stream including data bits, parity bits and signalling bits. Thus they are retimed and reshaped signals which appear on a lead 120 for continued transmission along the repeatered line. The regenerated signals traverse a modulator arrangement 115 and are applied to a laser transmitter circuit 116 which converts the electronic pulses into optical pulses. The regenerated optical pulses are produced on the optical fiber 102 for continued transmission along the repeatered line toward the east terminal.

The modulo-2 counter 111 also responds to the recovered clock pulses and the received data stream, both of which are applied to an AND gate 112. Output signals for the AND gate 112 are a series of retimed pulses which are applied to a toggle flip-flop 113. This toggle flip-flop 13 is alternately set and reset by succeeding ones in the received bit stream producing output signals in a molulo-2 count. Because the bit stream is random ones and zeros, the output of the modulo-2 counter occurs at half the rate of the ones in the input bit stream.

The output signals of the modulo-2 counter 111, are used for dual purposes. One purpose is to determine a bit error rate. Another advantageous purpose is to help detect the command code word signals which are transmitted in the command signalling channel superimposed on the parity channel being transmitted from the west terminal.

Figure 7:
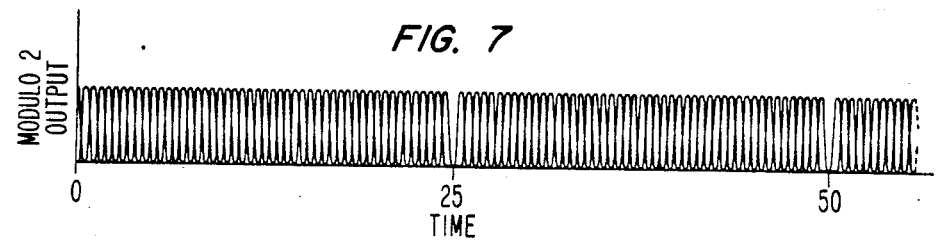
FIGS. 7, 8, 9 and 10 are waveforms relating to operation of the repeater shown in FIG. 6.

Referring now to FIG. 7, there is shown a typical repetitively swept waveform from the output of the modulo-2 counter 111 during regular error free transmission. Because even parity is used, the output of the modulo-2 counter produces a very distinctive bit stream when error free transmission occurs. As long as there are no errors nor command signals, the first 24 bits of each block of data from the modulo-2 counter are random ones and zeros, as shown by the envelope of the waveform during those bit positions. As shown in FIG. 7, the output bit in the parity bit time slot of each block is always zero because the state of the modulo-2 counter was initially zero. If the counter state initially is a one, then all of the parity bits are one during error free transmission. Thus a string of all zeros or all ones is generated in the 25th time slot, or the parity channel.

Referring again to FIG. 6, the output waveform of the modulo-2 counter 111 is filtered through a low pass filter LPF and is applied to a bit error rate circuit BER, which includes an amplifier and a threshold detector. A counter for determining the number of threshold crossings and thus the number of errors which occur during a test interval is included in a common supervisory circuitry 125 of the repeater circuit 37. No command code words are transmitted during any interval in which block errors are being counted.

Figure 8:
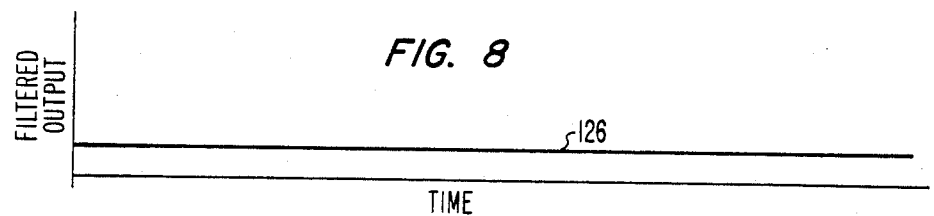

FIG. 8 shows the result of low pass filtering of the output of the modulo-2 counter 111 when the system is transmitting error free and without command signals. A signal 126 of uniform potential is produced and applied to the bit error rate circuit BER.

Figure 9:
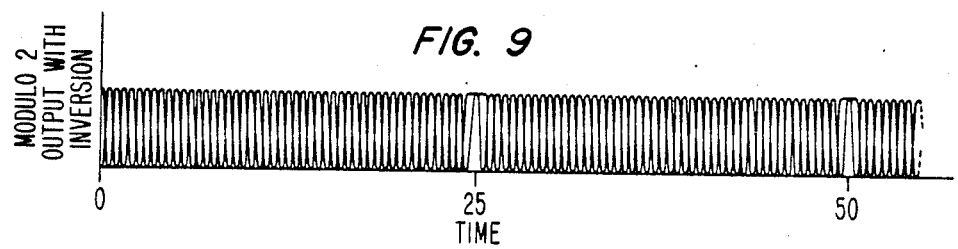

Referring now to FIG. 9, there is shown a typical repetitively swept waveform from the output of the modulo-2 counter 111 after an error occurs following a series of zero pulses in the parity channel time slot. A single error or an odd number of errors in the bits of a parity block cause the modulo-2 counter output bit in the parity bit time slot to change from zero to a one because the counter 111 counts an odd number of ones during the parity block. The occurrence of the odd number of bits in the parity block complements the state of the pulse in the parity channel from the zero level to the one level. A subsequent stream of bits from the modulo-2 counter 111 in the parity channel are all ones, as shown in FIG. 9.

Figure 10:
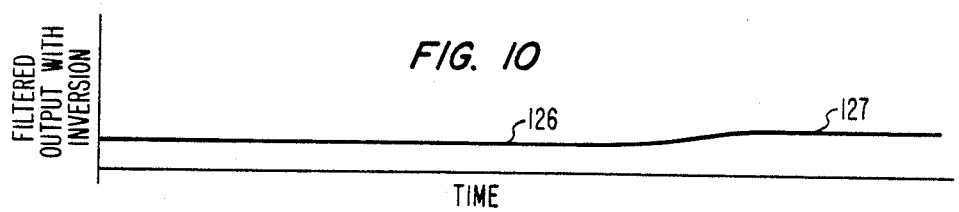

FIG. 10 shows the result of low pass filtering of the output of the modulo-2 counter when an error occurs in the parity block of data. The potential level shifts from the value 126 for the stream of all zeros to a different value 127 representing the stream of all ones. Such level shift is detected by the bit error rate circuit BER of FIG. 6 and is counted by the counter previously mentioned as residing in the common supervisory circuit 125 of FIG. 6. This new stream of ones from the modulo-2 counter in the parity channel continues until another odd number of errors occurs in a subsequent parity block. At that time the bit in the parity channel is inverted once again to zero. The filtered output of the modulo-2 counter shifts from the one level to the zero level. The counter in the common supervisory circuit counts only zero-to-one transitions so that it counts one half the number of errors which are detected.

One half of the bit error rate can be determined by counting the number of zero-to-one transitions which occur during a predetermined interval. The low pass filter LPF is designed to pass all signal components at frequencies below approximately 7 kHz. The cutoff frequency of the filter LPF determines the dynamic range of the bit error rate circuit BER. Such dynamic range is between approximately $10^{-12}$ and $10^{-5}$.

Figure 11:
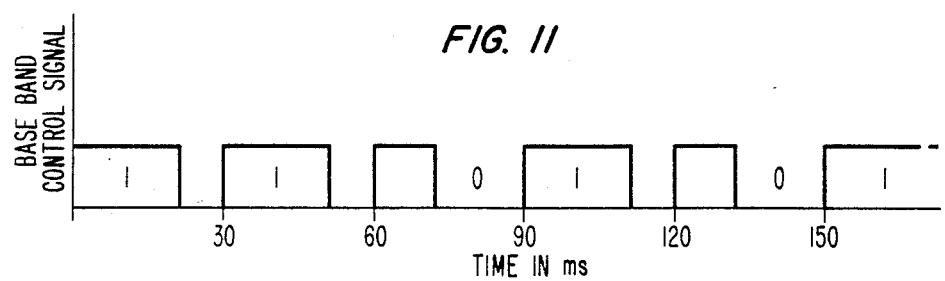
FIG. 11 is a waveform of a baseband supervisory signal which is pulse width encoded for transmission.

FIG. 11 shows a pulse stream representing a part of a command code word as a baseband signal. Low speed signals are used for the command signals. Pulse time slots of approximately 30 ms are marked on the time axis. Ones and zeros are pulse width modulated and are represented as wide and narrow pulses, respectively. A one is a 20 ms wide pulse, and a zero is a 10 ms wide pulse. This baseband command signal is generated by the command encoder 95 of FIG. 5. Several signalling bit time slots occur at the output of the divider circuit 90 in FIG. 5 while the baseband command code word signal from the command encoder 95 is at the high level for either a one or a zero pulse. Concurrent high inputs to the AND gate 92 produce a high output signal on the lead 76 for causing a parity bit on the lead 72 to be complemented by the EXCL OR gate 74 and put out on the lead 75. Thus the signalling bit S in the command channel is complemented every time that bit S time slot occurs while the baseband command code word signal is high.

A resulting stream of data with a string of complemented bits in the command channel is transmitted along the repeatered line from west to east through the entire system including the repeater 37 of FIGS. 4 and 6. In the repeater the stream of data from the modulo-2 counter 111 including the complemented signalling bits S is applied through a bandpass filter 128 and an amplifier 129 to a detector 130. Since the complementing of the signalling bit occurs continuously over a relatively lengthy interval, it causes the filtered output of the amplifier 129 in FIG. 6 to shift back and forth between voltage levels like the shift shown in FIG. 10.

Figure 12:
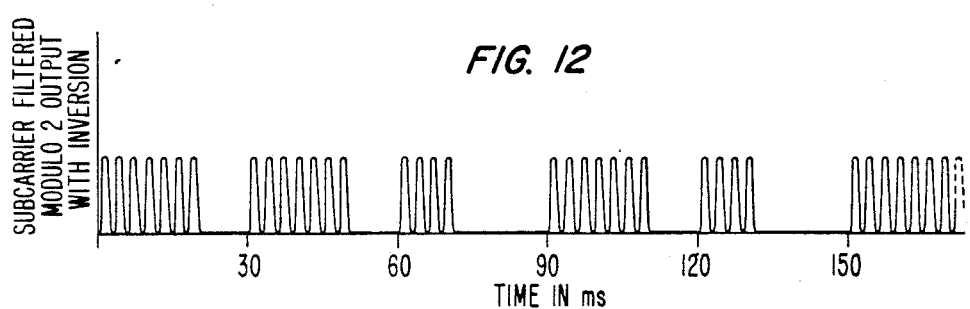
FIG. 12 is a waveform of subcarrier bursts which are encoded as pulse width modulated signals.

As shown in FIG. 12, this succession of alternating high and low level voltages is produced from the output of the amplifier 129 as a pulse width modulated subcarrier signal. Long bursts (approximately 20 ms) of the subcarrier represent ones. Short bursts (approximately 10 ms) of the subcarrier represent zeros.

The subcarrier frequency is the same for both the command channel and a response channel, to be described. The response channel is used for communicating information from the repeater 37 of FIG. 4 back through the repeatered line to the west terminal 31. A repetition rate for the signalling bit time slots determines the subcarrier frequency. The rate of transmitting the signalling bits S in the parity channel is determined by the obtainable signal-to-noise ratio on the command channel as well as on the response channel.

A jitter channel can be used to transmit the response information along the repeatered line back to the west terminal 31. Selection of the pulse rate for the signalling bit channel depends largely upon the design of that jitter channel, which is described in greater detail hereinafter.

Figure 13:
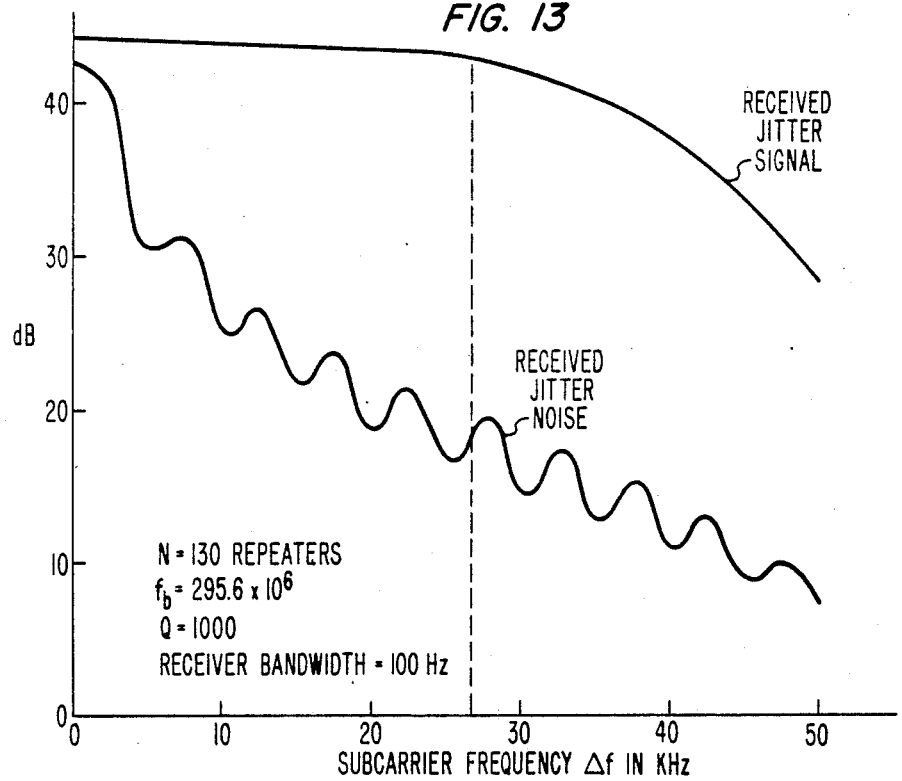
FIG. 13 presents received jitter signal and noise characteristic curves for a jitter channel used for responses in a transmission system having many repeaters.

Referring now to FIG. 13, there are shown received jitter signal and noise characteristic curves for a long transmission line having n repeaters wherein, as an example, n equals 130 repeaters.

In FIG. 13, the received jitter signal characteristic is a plot of the product of the transmitted jitter signal and the jitter transfer functions of all of the regenerator retiming circuits through which the response information passes on the way to the end terminal.

The received jitter noise characteristic of FIG. 13 is a plot of values determined by an analysis described by C. J. Byrne, B. J. Karafin and D. B. Robinson in the Bell System Technical Journal, November 1963, pages 2679–2714. The jitter transfer function for each regenerator is the ratio of the output jitter to the input jitter.

In the regenerators of the exemplary system, it is assumed that a second order Butterworth SAW filter is used for recovering the clock signals. Attenuation $\alpha(\Delta f)$ resulting from jitter transfer in a single filter is represented by an expression:

$$\alpha(\Delta f) = \log_e \frac{1}{1 + \left(\frac{\Delta f}{f_W}\right)^4} \text{ in nepers,} \quad (1)$$

wherein $\Delta f$ is the offset of frequency from the bit rate or frequency and $f_W$ is one half the 3 dB bandwidth of the retiming circuit. Phase $\phi(\Delta f)$ resulting from jitter transfer in a single filter is represented by an expression:

$$\phi(\Delta f) \approx \sqrt{2}\left(\frac{\Delta f}{f_W}\right) \text{ in radians.} \quad (2)$$

For a series of the filters in the regenerators along the line, accumulated systematic jitter noise $S_R(\Delta f)$ is represented by an expression:

$$S_R(\Delta f) = S_1(\Delta f) \epsilon^{\frac{R\alpha}{2}} \left[\frac{\cosh(R\alpha) - \cos(R\phi) + R\sigma^2}{\cosh(\alpha) - \cos(\phi)}\right]^{\frac{1}{2}} \quad (3)$$

wherein $S_1(\Delta f)$ is the jitter spectrum of a single regenerator and is 0 dB on the vertical axis of FIG. 13, R is the number of regenerators in the line, and $\sigma^2$ is the variance of SAW filter mistuning in radians squared. This accumulated systematic jitter noise $S_R(\Delta f)$ is calculated for various subcarrier frequencies $\Delta f$ and is plotted as the received jitter noise characteristic in FIG. 13. A subcarrier frequency is selected so that the received jitter noise in recovered clock signals is suppressed more than 20 dB below the received jitter signal while that signal is substantially at its maximum level.

It is noted by a dotted line in FIG. 13 that a subcarrier frequency of approximately 27 kHz is a suitable subcarrier frequency for the type of retiming circuit used in deriving the curves of FIG. 13. This selection together with considerations relating to fitting the command signalling bits S into the repetitive positions in the parity channel of FIG. 2 determines the precise subcarrier frequency.

Referring once again to FIG. 6, command signals are recovered from the parity channel by filtering the output of the modulo-2 counter 111 through a bandpass filter 128 with a center frequency at approximately 27 kHz. The resulting signal is amplified through the amplifier 129 as a pulse width modulated subcarrier signal, as shown in FIG. 12. The detector 130 receives the filtered output from the bandpass filter 128. Detector 130 is an envelope detector which produces a baseband pulse stream similar to the baseband pulse stream of FIG. 11. This recovered baseband data stream representing the command code word is applied by way of a lead 131 to the common supervisory circuit 125 in FIG. 6.

Command signals from other repeater modulo-2 counters are multiplied by way of leads 133 to the input of the bandpass filter 128 for other eastbound regenerator circuits to communicate with the common supervisory circuit 125.

The common supervisory logic circuit 125 temporarily stores the detected command code word pulses, decodes the command code words, and produces control signals for controlling predetermined operations of circuits and apparatus at the location of the repeater 37.

For example error monitoring can be accomplished on any selected regenerator section. A first command code word is transmitted to all repeaters in the system. The first command code word is a special code word which includes all zeros. This first command code word initiates the bit error count by clearing the error counter in every repeater location. Upon being cleared, all of the error counters commence counting parity errors. A second command code word, following a predetermined interval and including at least a single one, terminates the counting at all repeaters and causes the resulting block-error count of each repeater to be stored in the counter at that repeater location. No command code words are transmitted during the interval in which parity errors are counted. Following these two interval setting commands, the repeater locations are polled individually for transmitting their respective stored block-error count back to the west end terminal. A third command code word, which is different for each repeater, is used for polling the repeaters to determine their respective bit error rates.

Figure 14:
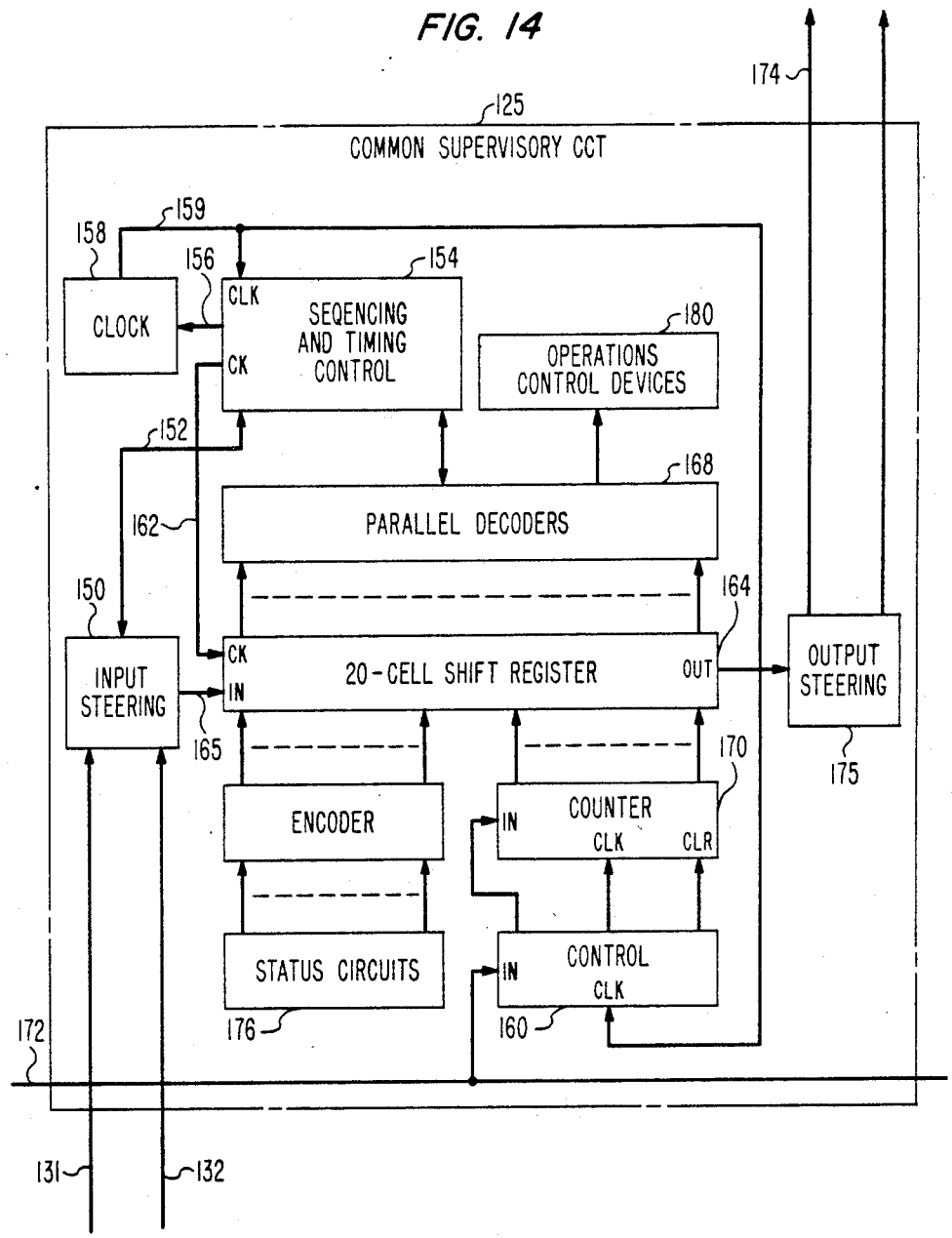
FIG. 14 is a block diagram of a common supervisory circuit used in the repeater of FIG. 6.

Referring now to FIG. 14, there is shown the common supervisory circuit 125 for receiving the command code words from the west terminal of FIG. 4, for receiving error signals from the regenerators located at the repeater 37, for controlling equipments at the repeater 37, and for sending messages from the repeater 37 back to the west terminal 31.

In FIG. 14 the command code words from the west terminal appear on the lead 131 and from the east terminal on a lead 132. The command code words are applied to an input steering circuit 150. The east and west terminals are controlled so that command code word signals from only one terminal are transmitted at a time. The first pulse of any command code word from the west terminal is coupled from the lead 131 through the input steering circuit 150 and a bus 152 to a sequencing and timing control circuit 154 for initiating operation of the common supervisory control circuit 125. Also in the input steering circuit 150, this first pulse from the west terminal temporarily inhibits processing of commands from the east terminal.

Sequencing and timing control circuit 154 includes sequential logic circuits for producing control signals that enable the various parts of the supervisory control circuit 125 to step through a series of states. First of all a signal is applied by way of a lead 156 to a local clock generator 158 for initiating a series of clock pulses at the pulse rate of the command code words. These clock pulses are applied by way of a lead 159 to clock inputs of the sequencing and timing control circuit 154 and a counter control circuit 160.

Clock pulses thus applied to the sequencing and timing control circuit 154 accomplish the stepping control within the sequencing and timing control circuit 154 and are delayed therein by half of a pulse time slot for the command code words. For each command code word, twenty of the delayed clock pulses are produced and applied by way of a lead 162 to the clock input of a 20-cell shift register 164.

A twenty bit recovered command code word in the baseband waveform of FIG. 11 is applied serially from the lead 131 of FIG. 14 through the input steering circuit 150 and a lead 165 to the serial data input of the shift register 164. These bits are clocked into the shift register by the delayed clock pulses on the lead 162.

Upon receipt of the last, or end, bit of the command code word, the decoders 168 decode the received code word. The repeater address, the regenerator identification, and the operation to be performed are decoded. If the decoded address matches the assigned address of the repeater, if the last bit is a one, and if parity checks, signals are generated by the decoders 168 and by the sequencing and timing control circuit 154 for performing the desired operation.

When the special all zeros command code word is recovered and decoded, the supervisory control circuit 154 in every repeater will respond. It initiates a bit error rate determination by causing the state of a counter 170 to be reset at all repeaters. Bit errors, which are detected subsequently by the bit error rate circuit BER of any regenerator working in the line, are counted in the associated counter 170. The bit error rate circuits BER associated with the eastbound regenerators of the repeater 37 of FIG. 6 are shown multipled therein from leads 173 by way of a lead 172 to the supervisory control circuit 125. The lead 172 also is shown in FIG. 14. Counting is terminated simultaneously in all repeaters by sending the second code word which may be any code word with at least a single one in it, as previously mentioned. The resulting count in each repeater is held in the counter 170 until the counter is accessed subsequently. Another subsequent, or third, code word addressing any specific repeater and requesting the bit error information can initiate a response transmission back to the west terminal. Such response will include the count stored in that repeater.

During this response transmission operation, the end bit of the bit error information request command code word, a one, is extended by the west terminal for an interval equalling the duration of two more command code words. In FIGS. 6 and 14, this extended end bit puts a continuous subcarrier signal on a lead 174 for transmitting response information back to the west terminal.

Referring now to FIG. 15, the TABLE C shows a response code word format which is used for transmitting response information from the repeater 37 to the west end terminal. There are forty bits in each response. The first twenty bits 1-20 are the same as the received command code word stored in the shift register 164 of FIG. 14. Nine bits 21-29 represent the error count stored in the counter 170. Bits 30-31 indicate which of up to four laser transmitters is operating. Eight bits 32-39 show which of several regenerators was monitored for errors or which of several optical fibers is connected to the monitored regenerator. The last bit 40 is an end bit which is always a one.

In a first part of the extended end bit interval controlled by the west terminal, the twenty bit command code word stored in the shift register 164 serially is read out of the shift register in response to a series of clock signals on the lead 162. This word is read out through an output steering circuit 175 to the lead 174 in FIG. 14. The twenty bit baseband serial pulse stream, produced from the output of the shift register 164, is converted by the steering circuit 175 to a pulse width modulated baseband signal, as shown in FIG. 11. At its output the output steering circuit 175 presents an open transistor collector for representing a one and a saturated transistor collector for representing a zero. The resulting pulse width modulated signal modulates the subcarrier on the lead 174 into pulse width modulated bursts of the subcarrier, as shown in FIG. 12. That is the open collector representing a one at the output of the steering circuit 175 enables the subcarrier on lead 174 to be applied to a phase modulator 178 in FIG. 6. Alternatively the saturated collector condition at the output of the circuit 175 shorts the subcarrier on the lead 174 to ground.

A second part of the extended end bit interval controlled by the west terminal is initiated by loading the contents of the counter 170, which are to become the response code word bits 21-29, and the encoded contents of status circuits 176, which are to become the response code word bits 30-40, in parallel into the shift register 164. Thus the response code word is formed in the shift register. Thereafter this response code word, which in our example contains the block error count, is read out serially from the shift register through the output steering circuit 175 to the lead 174, as a result of a stream of twenty clock pulses from the circuit 154 over the lead 162. The response code word also is converted to the pulse width code format which pulse width modulates the subcarrier on the lead 174.

All of the pulse width modulated subcarrier pulses are transmitted from the lead 174 by way of the modulator 178 and a laser transmitter 179 to the west terminal. Simultaneously these response information code word signals are transmitted by way of a multiple arrangement through leads 177 and other modulators and laser transmitters, not shown, also to the west terminal. The modulator arrangement 178 in FIG. 6 phase modulates the main westbound data stream with the pulse width modulated bursts of subcarrier representing the response code word information.

In FIG. 6 the phase modulator 178 is a low pass filter T-network including a pair of inductors and a shunt capacitance. The shunt capacitance includes a fixed capacitor and a varactor diode 185. The shunt capacitance provides a high driving impedance for the response code word modulated subcarrier on the lead 174, which is an amplitude modulated signal.

Modulator 178 converts the amplitude modulated subcarrier signal to a phase modulated transmitted jitter signal. Voltage variation on the lead 174 changes the capacitance of the varactor diode 185. This change of capacitance in the filter network of the modulator 178 changes its cutoff frequency and phase shift.

In the modulator 178, the west bound main data stream is transmitted through the pair of inductors 186 to the laser transmitter 179. The response information code word modulated subcarrier on the lead 174 phase modulates the main west bound data stream. The phase modulation caused by the subcarrier imposes the transmitted jitter signal in the timing of that data stream. This transmitted jitter signal, which is controlled by the subcarrier modulated with the response code word information, provides a jitter channel for transmitting the response code word information to the west terminal 31 of FIG. 4.

Because the response information is transmitted in the jitter channel and because all jitter is transmitted through all of the system regenerators to the end terminal, the response information reaches the terminal 31. This is the received jitter signal which is represented by the signal characteristic of FIG. 13.

A frequency for the subcarrier is selected to fall well within the pass band of the retiming circuits of the regenerators. The subcarrier frequency providing the best available received jitter signal-to-noise ratio is used for the response channel. The subcarrier frequency may be at any frequency in a range from the response channel base band to the pass band of the regenerator timing recovery circuits. Within that range there is an optimum subcarrier frequency which provides both a near maximum received jitter signal-to-noise ratio and a small value of received jitter signal attenuation. Additionally in FIG. 13, phase modulation of the subcarrier at 27 kHz provides 20 dB or more noise advantage over baseband modulation at 0 kHz.

The resulting response jitter channel in the westbound main data stream transmits the response code word to the west terminal. At the west terminal 31 of FIG. 4, the response code word is received and decoded. As previously mentioned, the response code word is in two parts. The first part is a duplicate of the command code word and for our example is the third command code word requesting the block error count from the repeater 37. This first part of the response code word is used for verifying the identity of the responding repeater and the nature of the response information following. The second part of the response code word in our example contains the block error count from the repeater 37.

Figure 16:
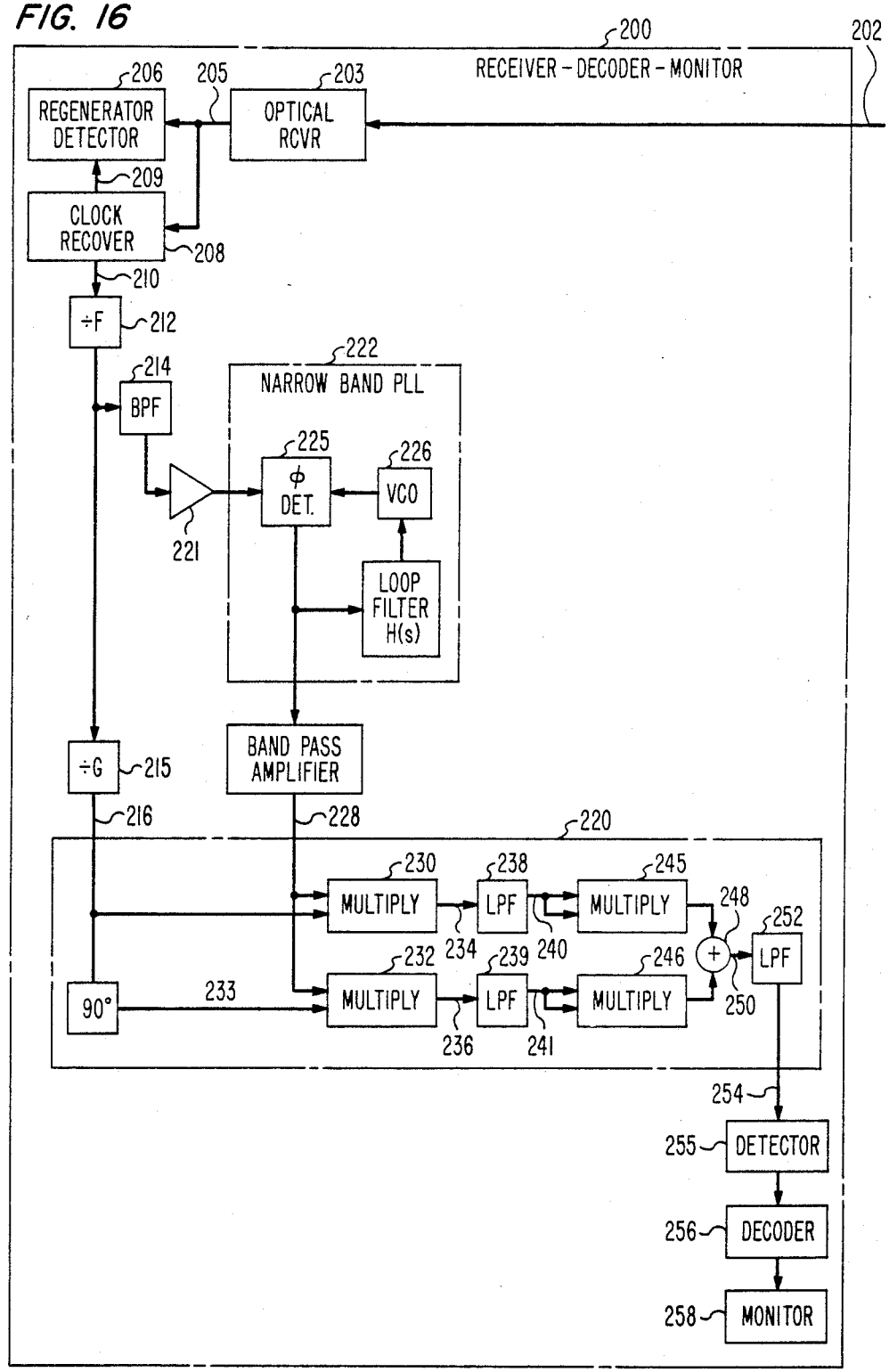
FIG. 16 is a block diagram of a receiver-decoder-monitor circuit for the end terminal of FIG. 4.

Referring now to FIGS. 4 and 16, a receiver-decoder-monitor 200 receives the west bound data stream by way of an optical fiber 202. The west bound optical data stream including the jitter channel carrying the response code word is converted to an electronic data stream by an optical receiver 203. Data is recovered from the resulting data stream on a lead 205 by a regenerator-detector 206. Timing signals are extracted from the main data stream by a clock recovery circuit 208. Such recovered timing signals control the regenerator-detector circuit 206 by way of a lead 209.

Advantageously, the recovered timing signals include the jitter channel carrying the response code word information, which can be readily recovered as follows.

A lead 210 applies the recovered clock signals to a divider circuit 212 that divides the clock rate by a factor F which is chosen so that the phase variation at the input to a phase detector 225, to be described, does not exceed ±90 degrees. Twenty-five is a suitable factor F for most long systems. A resulting reduced rate clock signal is applied to both a band pass filter 214 and another divider 215, which further divides by another factor G to reduce the clock rate to the frequency of the subcarrier used for the jitter channel. This subcarrier rate clock signal, which has a waveform represented by an expression $\cos(\omega_c t + \phi)$, is applied through a lead 216 to a quadrature homodyne circuit 220. The terms $\omega_c$ and $t$ are, respectively, the angular velocity of the subcarrier in radians and time in seconds.

Clock signals filtered by the filter 214 are applied through an amplifier 221 to a narrow band phase-locked loop 222. Because of the jitter channel, the clock signals have phase variations. Such phase variations are within the linear range of the phase detector 225 and are converted by the phase-locked loop 222 into amplitude variations. A very stable crystal controlled oscillator 226 is used in the phase-locked loop. Resulting amplitude modulated signals on a lead 228 have waveforms that can be represented by an expression $S(t) \cos(\omega_c t)$, wherein $S(t)$ is the time varying amplitude. These signals are applied to a pair of multipliers 230 and 232 in the quadrature homodyne circuit 220.

In the quadrature homodyne circuit 220, the subcarrier rate clock signal on the lead 216 is applied directly to another input of the multiplier 230 and is phase shifted 90 degrees and applied by way of a lead 233 to the multiplier 232. Thus the waveform $\cos(\omega_c t + \phi)$ is applied by way of the lead 216 to the multiplier 230, and a waveform $\sin(\omega_c t + \phi)$ is applied by way of the lead 233 to the multiplier 232.

In response to the signals on the leads 228, 216 and 233, the multipliers 230 and 232 produce complex waveforms, respectively, on leads 234 and 236. Low pass filters 238 and 239 pass only variations in the frequency range of the response code word signal pulse rate. A resulting waveform on a lead 240 is represented by $S(t)/2 \cos(\phi)$. On lead 241 the resulting waveform is represented by $S(t)/2 \sin(\phi)$.

A pair of multiplier circuits 245 and 246, respectively, square the signals on the leads 240 and 241. Resulting output signals $[S(t)/2 \cos(\phi)]^2$ and $[S(t)/2 \sin(\phi)]^2$ are summed in an adder circuit 248. The sum of the squared sine and cosine terms equal one leaving on a lead 250 an amplitude modulated signal waveform represented by $[S(t)/2]^2$. This signal on the lead 250 is low pass filtered by a filter 252 into a base band signal like the waveform in FIG. 11 and representing the response code word information transmitted by the repeater 37 of FIGS. 4 and 6. This base band signal is produced on a lead 254 at the output of the quadrature homodyne circuit 220.

Further along in the receiver-decoder-monitor circuit 200, the baseband signal, representing the response code word information on the lead 254, is detected by a detector circuit 255 and is decoded in a circuit 256. Decoded signals then are applied to a monitor arrangement 258 which can store, analyze and display desired information.

Returning now to the bit error rate example commenced earlier in the description, the two parts of the response information code words are received and decoded in the circuit 256. The first part of the received response information code word verifies the address of the repeater section from which the bit error count is being received and indicates that the bit error count was requested. The second part of the received response information code word includes the block error count from the addressed repeater.

In the monitor arrangement 258, the block error count is analyzed together with test interval information stored in the terminal earlier when the command code words were sent out. From this analysis the bit error rate is determined and displayed by the monitor 258.

It is noted that the error counting, the subsequent interrogation and response to the terminal, and the determination of the bit error rate are accomplished while the main transmission line is in its regular operating condition. Error monitoring from end to end is not affected by the command signalling because the error monitoring circuits located at the end terminals are designed to ignore the last parity bit of every frame of data. This does not adversely affect the error monitoring operation. Thus the described command channel provides an advantageous in-service system maintenance command and response signalling capability.

In addition to the previously described bit error rate example, other command code words are used to perform other operations or to operate other circuits at the repeater location. In FIG. 14 a group of operations control devices 180 in the repeater performs in response to decoded command code words. Some advantageous functions which are controlled thereby at the repeater include reading laser bias current, reading automatic gain control voltage, operating relays to change laser transmitters, and operating relays to change optical fibers. As a result of each of those command code words, the prescribed operation is carried out at the repeater, the command code word is transmitted back to the requesting end terminal as a part of a response information code word formed at the repeater, and other response information is transmitted back to the requesting end terminal as another part of the response information code word.

The foregoing describes an embodiment of the invention. This embodiment together with others obvious in view thereof are considered to be within the scope of the invention.

What is claimed is:

1. A maintenance response signalling arrangement for a digital transmission system using a main data stream between a repeater and an end terminal, the arrangement comprising means at the repeater responsive to a signal received from the end terminal for producing a subcarrier;

means for modulating the subcarrier information from the repeater;

means responsive to the modulated subcarrier for varying delay of the main data stream between the repeater and the end terminal to produce a jitter signal representing the information on the main data stream;

means responsive to the jitter signal for recovering the information, the recovering means include means responsive to the main data stream for recovering a clock signal including the jitter signal representing the information;

means responsive to the recovered clock signal for reproducing the modulated subcarrier;

means responsive to the recovered clock signal for producing quadrature clock signals at the frequency of the subcarrier; and means responsive to the modulated subcarrier and the quadrature clock signals for recovering the information.

2. A maintenance response signal receiver for a digital transmission system terminal, the receiver comprising means for receiving a main data stream including a jitter signal representing response information modulated on a subcarrier;

means responsive to the main data stream for recovering a clock signal including the jitter signal representing the response information, means responsive to the recovered clock signal for reproducing the modulated subcarrier, means responsive to the recovered clock signal for producing quadrature clock signals at the frequency of the subcarrier, and means responsive to the reproduced modulated subcarrier and the quadrature clock signals for recovering the response information.

3. A receiver comprising means for receiving a carrier modulated with information, means responsive to the carrier for producing quadrature clock signals $\cos(\omega_c t + \phi)$ and $\sin(\omega_c t + \phi)$ at the frequency of the carrier, means responsive to the clock signal $\cos(\omega_c t + \phi)$ and to the modulated carrier $S(t)\cos(\omega_c t)$ for producing a first product component waveform $S(t)/2 \cos(\phi)$, wherein $S(t)$ is a time varying amplitude function, $\omega_c$ is an angular velocity, $t$ is time, and $\phi$ is a phase angle, means responsive to the clock signal $\sin(\omega_c t + \phi)$ and to the modulated carrier $S(t)\cos(\omega_c t)$ for producing a second product component waveform $S(t)/2 \sin(\phi)$, and means responsive to the first and second product component waveforms for producing an amplitude modulated signal waveform $(S(t)/2)^2$.

* * * * *

UNITED STATES PATENT AND TRADEMARK OFFICE
CERTIFICATE OF CORRECTION

PATENT NO. : 4,586,186
DATED : April 29, 1986
INVENTOR(S) : Cleo D. Anderson

It is certified that error appears in the above-identified patent and that said Letters Patent is hereby corrected as shown below:

In the Specification, Column 9, lines 29 and 30, the formula reading $$\alpha(\Delta f) = \log_\varepsilon \frac{1}{1+(\frac{\Delta f}{f_W})}^4 \text{ in nepers,}$$

should read $$\alpha(\Delta f) = \log_\varepsilon \frac{1}{1+(\frac{\Delta f}{f_W})^4} \text{ in nepers,}$$

Column 9, line 34, should read --frequency and $f_W$ is one half the 3 dB bandwidth of the--, Claim 1, line 44, after "subcarrier" insert --with--.

Signed and Sealed this

Thirtieth Day of June, 1987

Attest:

DONALD J. QUIGG

Attesting Officer

Commissioner of Patents and Trademarks